United States Patent [19]

Robison

[11] 4,074,159

[45] Feb. 14, 1978

[54] DYNAMO-ELECTRIC MACHINE

[76] Inventor: Russell O. Robison, 103 Plymouth East Road, Plymouth, Ohio 44865

[21] Appl. No.: 677,758

[22] Filed: Apr. 16, 1976

[51] Int. Cl.² .......................................... H02K 21/28
[52] U.S. Cl. .............................. 310/154; 310/40 MM; 310/89
[58] Field of Search .............. 310/40, 40 MM, 42, 43, 310/154, 234, 235, 233, 89, 254

[56] References Cited

U.S. PATENT DOCUMENTS

| 2,256,321 | 9/1941 | McCusker | 310/235 |
|---|---|---|---|
| 2,944,169 | 7/1960 | Schmidt | 310/40 MM UX |
| 3,064,150 | 11/1962 | Barnes | 310/154 |
| 3,090,877 | 5/1963 | Baumhart | 310/154 |
| 3,135,887 | 6/1964 | Schaffan | 310/154 |
| 3,182,215 | 5/1965 | DuBois, Jr. et al. | 310/154 |
| 3,432,700 | 3/1969 | Diederichs | 310/42 |
| 3,600,615 | 8/1971 | Morita | 310/40 |
| 3,988,623 | 10/1976 | Yamaguchi et al. | 310/40 MM |

*Primary Examiner*—Donovan F. Duggan
*Attorney, Agent, or Firm*—Woodling, Krost, Granger & Rust

[57] ABSTRACT

An improved dynamo-electric machine such as an electric motor is disclosed including a novel commutator configuration and novel means for aligning a first machine housing relative to a second machine housing. The commutator includes an insulating member having a first and a second end with an outwardly extending member having a plurality of apertures therein extending from the first end of the insulating member. A recess extends partially through the insulating member from the second end of the insulating member. A plurality of electrically conducting members each having a first and a second mounting portion are established about a substantially cylindrical surface of the insulating member with the first mounting portions of the electrically conducting members extending through the apertures in the insulating member. The remaining portions of the first mounting members are bent radially outwardly to provide mounting terminals for connection with the rotor coils. The second mounting portions of the electrically conducting members are bent radially inwardly to engage the recess in the second end of the insulating member to secure the electrically conducting members to the insulating member. The machine includes a permanent magnet having a substantially cylindrical outer surface which is in frictional engagement with the internal diameter of the first machine housing with a portion of the permanent magnet extending from the first machine housing. The second machine housing is aligned relative to the first machine housing by a frictional engagement with the portion of the permanent magnet extending from the first machine housing. The foregoing abstract is merely a resume of one general application, is not a complete discussion of all principles of operation or applications, and is not to be construed as a limitation on the scope of the claimed subject matter.

7 Claims, 7 Drawing Figures

DYNAMO-ELECTRIC MACHINE

BACKGROUND OF THE INVENTION

1. Field of the Invention

This invention relates to electrical generator or motor structures and more particularly to generator or motor commutation structures and means for aligning housings of dynamoelectric machines.

2. Description of the Prior Art

The design and manufacture of dynamo-electric machines such as motors and generators has often been distinguished in terms of the size of the machines. What is a proper design for a fractional horsepower motor may be inadequate for a very large motor.

In fractional horsepower or small motors or generators the emphasis in the prior art has been to make the motor or generator more powerful, smaller in size and lower in cost. The rising material costs and assembly costs have made cost reduction design and paramount objective in the manufacture of fractional horsepower electric motors.

The prior art commutators for fractional horsepower electric motors were composed of a spool shaped insulating member having a cylindrical central member and outwardly extending ridges at the ends of the cylindrical member. Commutator terminals were mounted on the cylindrical member with portions of the commutator terminals extending through apertures in the ridges of the insulating member. Since most commutators require a lathe turning by a diamond stylis, or "diamond turn" the outwardly extending ridges on each end made the diamond turn process more difficult. Some in the prior art attempted to eliminate one of the outwardly extending ridges by incorporating a plurality of commutator terminals having inwardly projecting hooks. The commutator terminals were held in a fixture while insulating material was injection molded between the commutator terminals to cure about the hooks. Although this prior art construction enabled the commutator to be easily "diamond turned", the process of injection molding the insulating material was expensive and added to the total cost of the electric motor.

Another problem encountered in the prior art fabrication of fractional horsepower electric motors was the alignment of a first motor housing relative to a second motor housing. In many cases, the first motor housing was made different from the second motor housing to facilitate alignment of the first and second motor housing. Different first and second motor housings added to the cost of the electric motor.

Therefore it is an object of this invention to provide an improved dynamo-electric machine with commutator means having a single outwardly extending portion which allows the commutator surfaces to be easily "diamond turned."

Another object of this invention is to provide an improved dynamo-electric machine having an insulating member which includes an outwardly extending portion having a plurality of apertures and a recess coaxial with an axis of the insulating member and extending partially therethrough for mounting a plurality of electrically conducting members.

Another object of this invention is to provide an improved dynamo-electric machine having an insulating member and a plurality of electrically conducting members with portions thereof extending through apertures in an outwardly extending portion of the insulating member and with portions of the plurality of electrically conducting members extending into a recess of the insulating member for securing the electrically conducting members to the insulating member.

Another object of this invention is to provide an improved dynamo-electric machine incorporating a first and a second machine housing and a permanent magnet means with the second machine housing being aligned relative to the first machine housing through cooperation with the permanent magnet means.

Another object of this invention is to provide an improved dynamo-electric machine including a first and second machine housing and a permanent magnet mounted in the first machine housing to extend outwardly therefrom to enable alignment of the second machine housing through cooperation with the portion of the permanent magnet extending from the first machine housing.

Another object of this invention is to provide an improved dynamo-electric machine having commutator means which can be fabricated at approximately one-third the cost of the prior art commutators.

SUMMARY OF THE INVENTION

The invention may be incorporated into an improved dynamo-electric machine, comprising in combination, a rotor including a rotor coil means secured relative to said rotor shaft to rotate therewith, commutator means comprising an insulating member and a plurality of electrically conducting members secured to said insulating member, means for mounting said insulating member on said rotor shaft, means connecting said rotor coil means to said commutator means for enabling electrical continuity between said plurality of electrically conducting members and said rotor coil means, first and second machine housings including bearing means, permanent magnet means mounted to said first machine housing, first and second machine terminals, first and second electrical brushes mounted relative to one of said first and second machine housings and in electrical contact with said first and second machine terminals, and means for mounting said rotor in said first and second machine housings to be journalled by said bearing means with said first and second brushes being in contact with said commutator means and with said second machine housing being aligned relative to said first machine housing through cooperation with said permanent magnet means.

Other objects and a fuller understanding of this invention may be had by referring to the following description and claims, taken in conjunction with the accompanying drawings, in which:

DESCRIPTION OF THE PREFERRED EMBODIMENT

Figure 1:
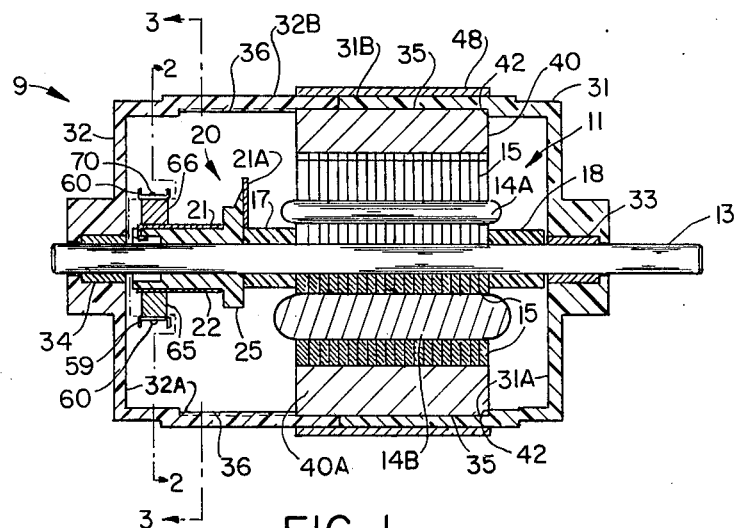
FIG. 1 is a side-sectional view of an improved dynamo-electric machine incorporating the instant invention.
Figure 2:
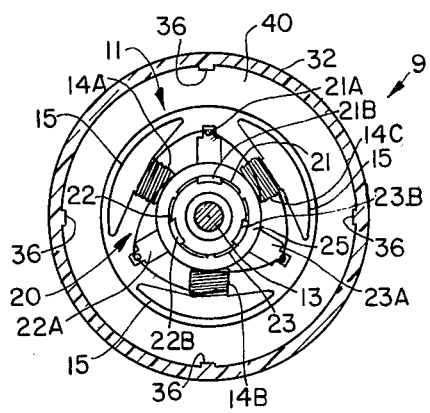
FIG. 2 is a sectional view along line 2—2 of the improved machine shown in FIG. 1.
Figure 3:
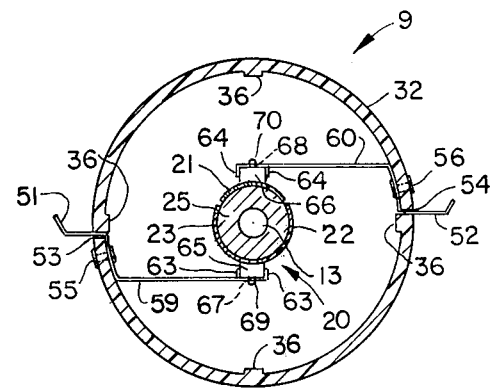
FIG. 3 is a sectional view along line 3—3 of the improved machine shown in FIG. 1.

FIGS. 1-3 illustrate various sectional views of an improved dynamo-electric machine 9 shown as an electric motor. The use of the term "motor" in the specification and claims includes dynamo-electric machines operating either as a motor or a generator. The electric motor 9 has a rotor 11 including a rotor shaft 13 and rotor coil means 14A-14C. A plurality of three pole motor laminations 15 are secured to shaft 13 for receiving the three rotor coils 14A, 14B and 14C with the laminations 15 being interposed between insulating washers 17 and 18. The rotor 11 in this embodiment is shown as a three pole rotor but it is understood that the instant invention is not limited to such a configuration.

A commutator means shown generally as 20 comprises a plurality of electrically conducting members 21, 22 and 23 secured to an insulating member 25 by first mounting portions 21A-23A and second mounting portions 21B-23B. The portions 21A-23A form terminals for connection to the rotor coils 14A-14C. The initial windings of coils 14A, 14B and 14C are respectively connected to portions 21A, 22A and 23A whereas the final windings of coils 14A, 14B and 14C are respectively connected to portions 22A, 23A and 21A. The commutator means 20 is mounted on shaft 13 in a preferred orientation relative to coils 14A-14C. This orientation enables the proper current flow to be directed to the proper rotor coils 14A-14C by the commutation brushes in relation to the magnetic field as is well known to the art.

The electric motor 9 comprises a first and a second machine or motor housing 31 and 32 having a substantially cylindrical outer portion and having end members for receiving bearings 33 and 34 for journaling shaft 13. The first and second motor housings 31 and 32 in this preferred embodiment are identical and may be made of a plastic material from a single injection molding die. Each of the first and second motor housings 31 and 32 has a plurality of ribs 35 and 36, respectively forming an internal diameter of the first and second motor housings 31 and 32 effectively smaller than the essentially cylindrical internal diameter of the first and second motor housings 31 and 32.

A permanent magnet 40 shown as a ceramic magnetic ring has a uniform cylindrical outer diameter and a uniform cylindrical inner diameter for receiving the rotor 11. The magnetic ring 40 is pressed into the internal diameter of the first motor housing 31 to abut stops 42 and having a portion 40A of the ceramic magnetic ring 40 extending beyond the first motor housing 31. Pressing the magnet 40 into the first housing 31 deforms the ribs 35 as shown to align the magnet relative to and to frictionally engage the first housing 31. The stops 42 and the insulating washers 17 and 18 are selected to dispose the rotor 11 within the magnetic ring 40 when the motor 9 is assembled.

The second motor housing 32 is engagable in a frictional fit with magnet 40 and more particularly with the portion 40A of the magnet 40 extending beyond the first motor housing 31. Pressing the second motor housing 32 on the magnetic ring 40 deforms a portion of the ribs 36. The engagement between the internal diameter furnished by ribs 36 and the cylindrical outer diameter of portion 40A aligns the second motor housing 32 relative to the first motor housing 31 enabling shaft 13 to freely rotate within bearings 33 and 34. A magnetic flux conducting ring 48 is mounted to the outside of the housings 31 and 32 to strengthen the magnetic field as known to the art.

The ring 48 is rolled of a magnetic flux conducting material forming a resilient split ring structure which is smaller in diameter than the outside surface of the housings 31 and 32. The ring 48 is frictionally held in place by the spring tension applied by the ring 48.

A first and a second motor terminal 51 and 52 extend through slots 53 and 54 in the second motor housing secured by rivets 55 and 56 for positioning commutating brush arms 59 and 60 which are integral with the motor terminals 51 and 52. The first and second brush arms 59 and 60 in this embodiment are also identical to enable economic manufacture. Each of the brush arms 59 and 60 includes tabs 63 and 64 for holding brushes 65 and 66. Apertures 67 and 68 in the first and second brush arms 59 and 60 enable silver conductive epoxy paint 69 and 70 to aid the tabs 63 and 64 securing the brushes 65 and 66 to the brush arms 59 and 60. The first and second motor terminals 51 and 52 are located such that the brushes 65 and 66 are disposed on the commutating surface of the electrically conducting members 21-23 as shown.

Figure 4:
FIG. 4 is a front view of an electrically conducting member which forms a part of a commutator.
Figure 5:
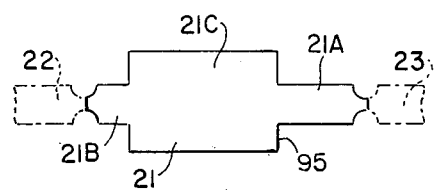
FIG. 5 is a top view of the electrically conducting member shown in FIG. 4.

FIGS. 4 and 5 illustrate front and top enlarged views of the electrically conducting member 21 shown in FIGS. 1-3. All of the electrically conducting members 21-23 are identical. The electrically conducting members 21-23 may be fabricated in a long chain as illustrated by the phantom electrically conducting members 22 and 23 in FIG. 5 and subsequently contoured as shown in FIG. 4. The electrically conducting member 21 includes a commutation surface 21C interposed between the first mounting portion 21A and the second mounting portion 21B. The smaller portions 21A and 21B meet the larger portion 21C at shoulders 95.

The electrically conducting members may be formed from electrical copper having specific characteristics of 10.37 ohms per circular mill foot formed from 0.020 strip stock; 0.0005/.001 nickel-tin plate-65% tin-35% nickel or any other suitable base material with or without suitable plating.

Figure 6:
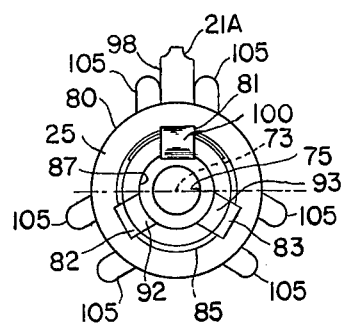
FIG. 6 is a front view of an insulating member and a single electrically conducting member in a partially assembled commutator.
Figure 7:
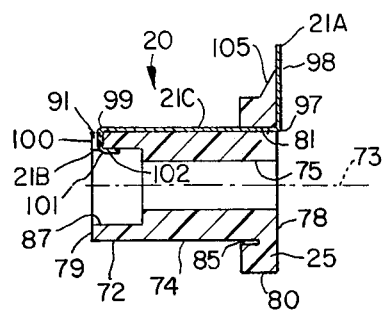
FIG. 7 is a side-sectional view of the partially assembled commutator shown in FIG. 6.

FIGS. 6 and 7 illustrate an enlarged front view and a side sectional view of a partially completed commutator 20 as shown in FIGS. 1-3. The insulating member 25 has a substantially cylindrical body 72 about a cylindrical axis 73 with an outer cylindrical surface 74 and an internal cylindrical surface 75 disposed between a first and a second end 78 and 79 respectively. The contour of the electrically conducting member 21 shown in FIG. 4 conforms to the contour of the outer cylindrical surface 74 of the insulating member 25. The inner cylindrical surface 75 is commensurate with the diameter of the shaft 13. The insulating member 25 includes an outwardly extending member 80 having a plurality of apertures 81-83 uniformly disposed about the axis 73. A recess 85 extending parallel with the axis 73 extends about the outwardly extending member adjacent the outer cylindrical surface 74 and in proximity to the first end 78 of the insulating member 25. The second end 79 of the insulating member 25 includes a recess 87 coaxial with axis 73 and extending from the second end 79 partially through the insulating member 25 toward the first end 78. A plurality of undercuts 91-93 are disposed about the axis 73 and aligned with the apertures 81-83 respectively. The entire insulating member 25 may be a single injection molded piece of glass filled plastic material or any other suitable high temperature material.

The commutator 20 is assembled by slipping the first end portion 21A of the electrically conducting member 21 through aperture 81 until the surface 95 shown in FIG. 5 abuts the bottom of recess 85. The remaining portion of the first mounting member 21A is bent radially outwardly at 97 to form a tab 98 for connection to the rotor coils as shown in FIG. 2. A portion of the commutating surface 21C adjacent the shoulder 95 is contained within the recess 85 to add additional mechanical strength to the commutator 20. The second mounting portion 21B is bent radially inwardly at 99 to have a portion 100 extending radially inwardly toward the axis 73 through the recess 91 with a second bend 101 providing a portion 102 extending parallel to the axis 73 and engaging the internal diameter of the recess 87. The recess 87 enables the second mounting portion 21B to be bent in this fashion to engage the insulating member 25 while maintaining sufficient clearance for the shaft 13 extending through the inner cylindrical surface 75.

Outwardly extending member portions 105 add mechanical strength to the tabs 98 of the first mounting portion 21A extending radially outwardly from the axis 73.

The electrically conducting members 22 and 23 are installed in a similar fashion. The improved commutator 20 enables the commutator to be easily fabricated of simple materials and provide access across the second end 79 for diamond turning of the commutator surfaces 21C-23C. These commutators may be produced at approximately one-third the material and labor costs of comparable commutators for fractional horsepower motors.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a dynamo-electric machine having housing means, a rotor within the housing, the rotor housing laminations and coil means carried by and rotatable with the rotor, and a cylindrical permanent magnet within the housing and radially outwardly of the laminations and coin means in functional cooperation with the said laminations and coil means, the improvement of said housing means comprising a first and a second shell-like housing having facing open ends and axially aligned cylindrical walls abutted together at said open ends to enclose said rotor, said housings being of plastic material having integral ribs formed on the inner surfaces of said cylindrical walls and extending longitudinally of the housings, said ribs being deformed by said cylindrical permanent magnet pressed axially into said housings through the respective open ends thereof to provide a close frictional fit between the outer cylindrical wall of the permanent magnet and the inner cylindrical walls of both said housings and to provide that said first and second housings are axially aligned, and held assembled together to enclose the rotor, by said permanent magnet inter-engaged by said frictional fit between the permanent magnet and both said housings.

2. The improvement claimed in claim 1, and also comprising a ring of magnetic flux conduction material tightly embracing both said housings at the location of joinder outwardly of said permanent magnet, said ring aiding in holding the housings together and functionally cooperating with said rotor and permanent magnet.

3. The improvement claimed in claim 1, and in which said housings carry axially aligned bearing units for providing bearing support for said rotor.

4. The improvement claimed in claim 1, and in which said rotor carries within one of said housings commutator means, and said one housing has opposed brush carrying resilient electrical conducting arms mounted on opposite sides of the cylindrical walls of said one housing and electrically connected through the walls to electrical connecting means mounted at the outer surfaces of said walls, to conduct electricity between said connecting means and said brushes.

5. The improvement claimed in claim 4, and in which said commutator means comprise an electrical insulating body carried by the rotor to rotate therewith, said insulating body having a cylindrical portion and an enlarged round head portion at one end and an inner cylindrical recess at the other end, the commutator means comprising a plurality of electrically conducting segments mounted in insulated spaced relationship to each other on said insulating body, the intermediate portion of each segment being mounted on the outer surface of the cylindrical portion of said insulating body for consecutive engagement with said brushes, a first end portion of each segment extending through said head portion and thence extending at right angles radially outward against the head portion at said one end to be braced thereby, the said first end portion of each said segment being electrically connected outwardly of said insulating body to a separate coil of said coil means, an opposite end portion of each segment being formed to extend radially inward at the said other end of the insulating body and thence forward to extend axially of said insulating body into said recess against the inner walls of the recess, the said segments each mechanically embracing the insulating body in a longitudinal direction in engagement with the opposite ends thereof.

6. In a dynamo-electric machine having housing means, a rotor within the housing, the rotor housing laminations and coil means carried by and rotatable with the rotor, and a cylindrical permanent magnet within the housing and radially outwardly of the laminations and coil means in functional cooperation with the said laminations and coil means, the improvement of said housing means comprising a first and a second shell-like housing having facing open ends and axially aligned cylindrical walls abutted together at said open ends to enclose said rotor, said housings being of plastic material of deformable nature and having inner surfaces off-set from true cylindrical surfaces closely complementing the outer cylindrical surface of the said permanent magnet at spaced locations outwardly of the outer cylindrical surface of said permanent magnet, said housings being deformed by said permanent magnet to yield to the permanent magnet by the permanent magnet pressed axially into said housings through the respective open ends thereof to provide a close frictional fit between the outer cylindrical wall of the permanent magnet and the said inner surfaces of both said housings to provide that said first and second housings are axially aligned, and are held assembled together to enclose the rotor, by said permanent magnet inter-engaged by said frictional fit between the permanent magnet and both said housings.

7. The improvement claimed in claim 6 and in which the inner surfaces of said housing are made off-set from true cylindrical surfaces by providing projections extending radially inward from the said inner surface at spaced locations outwardly of the outer cylindrical surface of said permanent magnet.

* * * * *